S. Neff,
Well Tube.

No 102,699. Patented May 3. 1870.

Witnesses
F. Lehmann
C. L. Evert

Inventor
S. Neff
per Alexander Mason
Atty

United States Patent Office.

SIMON NEFF, OF CLYMOUTH, INDIANA.

Letters Patent No. 102,699, dated May 3, 1870.

IMPROVEMENT IN WELL-TUBES.

The Schedule referred to in these Letters Patent and making part of the same.

*To all whom it may concern:*

Be it known that I, SIMON NEFF, of Clymouth, in the county of Marshall and in the State of Indiana, have invented certain new and useful Improvements in Well-Tubes; and do hereby declare that the following is a full, clear, and exact description thereof, reference being had to the accompanying drawings and to the letters of reference marked thereon.

The nature of my invention consists in a framework of rings and ribs or stays, the point connected with the coupling, and, wrapped around the same, a piece of sheet metal, slotted so as to form a well-tube.

In order to enable others skilled in the art to which my invention appertains to make and use the same, I will now proceed to describe the mode in which my well-tube is or may be constructed, referring to the annexed drawings, in which—

Figure 1:

Figure 1 is a side view, and

Figure 2:
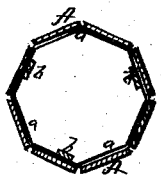

Figure 2, a cross-section of my well-tube.

Figure 3:

Figure 3 is a plan view of the plate which is wrapped around the frame.

I first take a series of rings, $a\ a$, and connect the same at suitable distances apart by means of ribs or stays $b\ b$, forming a round or polygonal-shaped frame, which is secured to the coupling C, and to the point B, forming the connection between the two.

Around the frame $a\ b$, thus formed, is wrapped a piece, A, of sheet metal, which is cut so as to form strips connected at one end, as shown in fig. 3.

The plate A is secured to the coupling C and point B by rivets, or other suitable means, and in some cases the frame $a\ b$ may not be secured to said point and coupling unless specially desired.

Having thus fully described my invention,

What I claim as new, and desire to secure by Letters Patent, is—

The within-described well-tube, formed of a framework of rings $a\ a$, and stays $b\ b$, its point B connected with the coupling C, and having wrapped around said frame a piece, A, of sheet metal, slotted, all substantially as herein set forth.

In testimony that I claim the foregoing, I have hereunto set my hand, this 22d day of June, A. D. 1869.

SIMON NEFF.

Witnesses:
JOHN G. OSBORNE,
JESSE MILLER.